US012783205B2

(12) United States Patent
Wang

(10) Patent No.: US 12,783,205 B2
(45) Date of Patent: Nov. 3, 2026

(54) METHOD FOR DISPLAYING CASTED CONTENT ON SPLIT WINDOW AND CIRCUIT SYSTEM

(71) Applicant: REALTEK SEMICONDUCTOR CORP., Hsinchu (TW)

(72) Inventor: Jie Wang, Jiangsu Province (CN)

(73) Assignee: REALTEK SEMICONDUCTOR CORP., Hsinchu (TW)

( * ) Notice: Subject to any disclaimer, the term of this patent is extended or adjusted under 35 U.S.C. 154(b) by 0 days.

(21) Appl. No.: 19/073,139

(22) Filed: Mar. 7, 2025

(65) Prior Publication Data

US 2025/0284449 A1 Sep. 11, 2025

(30) Foreign Application Priority Data

Mar. 11, 2024 (CN) ......................... 202410274951.1

(51) Int. Cl.

*G06F 3/14* (2006.01)
*G06T 7/13* (2017.01)
*G06T 11/60* (2026.01)

(52) U.S. Cl.

CPC .............. *G06F 3/1454* (2013.01); *G06T 7/13* (2017.01); *G06T 11/60* (2013.01); *G06T 2207/20132* (2013.01)

(58) Field of Classification Search

CPC ......... G06F 3/1454; G06T 11/60; G06T 7/13; G06T 2207/20132; H04N 21/43078; H04N 21/4858

See application file for complete search history.

(56) References Cited

U.S. PATENT DOCUMENTS

| | | | | |
|---|---|---|---|---|
| 2017/0139576 A1* | 5/2017 | Jeong | .................... | G06F 3/0346 |
| 2020/0380901 A1* | 12/2020 | Ryu | ...................... | G06F 3/1462 |
| 2025/0016256 A1* | 1/2025 | Chang | ................. | H04M 1/0216 |
| 2025/0130825 A1* | 4/2025 | Liu | ....................... | G06F 3/0484 |

FOREIGN PATENT DOCUMENTS

| | | |
|---|---|---|
| CN | 108463800 A | 8/2018 |
| CN | 111694533 A | 9/2020 |

* cited by examiner

*Primary Examiner* — Muhammad N Edun

(74) *Attorney, Agent, or Firm* — Li & Cai Intellectual Property (USA) Office

(57) ABSTRACT

A method for displaying a casted content on a split window and a circuit system are provided. The circuit system is applied to a display device. When the display device operates under a multi-window display mode, and the method is performed, the circuit system receives an image transmitted from a user device by an image-casting technology. An active region of the image can be obtained through an edge-finding process. The image of the active region can be extracted by cropping an inactive region. The image of the active region can be displayed in one of split windows of the display device after a display ratio of the image is adjusted according to an aspect ratio of the active region.

19 Claims, 7 Drawing Sheets

METHOD FOR DISPLAYING CASTED CONTENT ON SPLIT WINDOW AND CIRCUIT SYSTEM

CROSS-REFERENCE TO RELATED PATENT APPLICATION

This application claims the benefit of priority to China Patent Application No. 202410274951.1, filed on Mar. 11, 2024, in the People's Republic of China. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a method for casting a display content, and more particularly to a method for displaying a casted content on a split window in which regions without any content are cropped when a portrait-orientation image is projected onto a display device and a circuit system thereof.

BACKGROUND OF THE DISCLOSURE

In the related art, a user can manipulate a user device (e.g., a mobile phone or a tablet computer) to browse a content displayed on a screen in a portrait display mode, or to watch a video in a landscape display mode.

Further, the content displayed on the mobile phone or the tablet computer can be casted to a computer screen or a television by an image-casting technology for displaying the content. The user device can connect with an external device in a wired manner (e.g., USB Type-C or HDMI™) for displaying the content on the external device. Alternatively, the user device can wirelessly cast the content on the screen of the external device by a screen-mirroring technology (e.g., Miracast®, AirPlay®, or Google Chromecast®).

For example, whether the display device displays the content with a resolution of 1920*1080 in a portrait-orientation mode or a landscape-orientation mode, the content that is projected onto an external device by the screen-mirroring technology is still displayed with the resolution of 1920*1080. Therefore, if the screen of the external device designed for displaying the content in the landscape-orientation mode is used to display a portrait-orientation image, there will be two large black areas without any content on both sides of the screen.

Referring to FIG. 1, a user device 10 is used to project a portrait-orientation image displayed on the user device 10 to a screen of an external device 100 by the screen-mirroring technology. When a portrait-orientation image 101 is displayed on the external device 100, only a middle area of the screen of the external device 100 is used to display the projected content, and two sides of the screen of the external device 100 are shown as black areas 102 and 103. The black area of the screen of the external device 100 can be reduced if the user device 10 is changed from the portrait display mode to the landscape display mode.

In one further scenario, when the portrait-orientation image is projected onto the screen of the external device, the screen of the external device 100 can be split into two windows if the external device 100 performs a multi-window display mode (as shown in FIG. 2). In FIG. 2, the split windows of the screen of the external device 100 includes a first split window 201 that is used to display a TV show and a second split window 202 that is used to display the content projected from the user device 10 to the external device 100 by the screen-mirroring technology.

Further, according to the example shown in FIG. 2, the user device 10 projects the portrait-orientation image to one of the split windows (e.g., the second split window 202) of the external device 100 when the external device 100 is in a multi-window mode. The picture displayed on the screen of the external device 100 includes the portrait-orientation image 101 and the black areas 102 and 103 on the two sides of the screen. Thus, the image projected from the user device 10 and displayed in the second split window 202 is relatively small, and is not suitable for the user to watch. Currently, no development has been made on the screen-mirroring technology for improving viewing experiences when the portrait-orientation image is projected in one of the split windows of the external device mentioned above.

SUMMARY OF THE DISCLOSURE

In order to appropriately display an image casted from a user device on a display device (especially when the image is displayed on the display device in a multi-window display mode), the present disclosure provides a method for displaying a casted content on a split window and a circuit system.

According to one embodiment of the circuit system disposed in the display device of the present disclosure, the circuit system includes an image-processing circuit that performs the method for displaying the casted content on the split window. In the method, when the display device operates in the multi-window display mode, the circuit system receives an image from the user device, and extracts an active region having a displayed content from the image. After an active region image is obtained, and a display ratio of the active region image is adjusted, the active region image can be displayed in one of the split windows of the display device.

A quantity of the split windows provided by the display device under the multi-window display mode is at least two, and the at least two split windows are used to display a screen received from an image source and the active region image obtained from the user device, respectively.

In an aspect of the present disclosure, the circuit system implements an image-processing device connected with the display device for receiving the image transmitted from the user device by an image-casting technology.

Further, the user device is a handheld device that can operate in a portrait display mode or a landscape display mode. When the user device operates in the portrait display mode, a portrait-orientation image is transmitted to the display device by the image-casting technology.

When the active region is determined as a landscape-orientation image, one or more inactive regions are directly cropped based on information of the active region image. When the active region is determined as the portrait-orientation image, one or more inactive regions that are obtained by an edge-finding process are cropped, and an aspect ratio of the split window occupied by the active region is obtained. The aspect ratio is referred to for adjusting the display ratio of the active region image that is to be displayed in the split window.

Further, in the process of extracting the active region image by the circuit system, screen information is firstly obtained for the display device to display the image that is transmitted by the user device, and window information is also obtained for the display device to display the split window that is configured to display the image. Next, a coordinate system of the split window is established. Edges of the image can be obtained based on features of the image, and the active region is therefore obtained. The active region image is obtained by cropping the image based on coordinate parameters that define the active region.

When the active region is firstly obtained, a memory is used to store coordinate parameters of the active region obtained by the edge-finding process. When processing the active region image that is firstly obtained, the coordinate parameters of the active region can be obtained from the memory, and a subsequent displaying procedure is then performed.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

Figure 1:
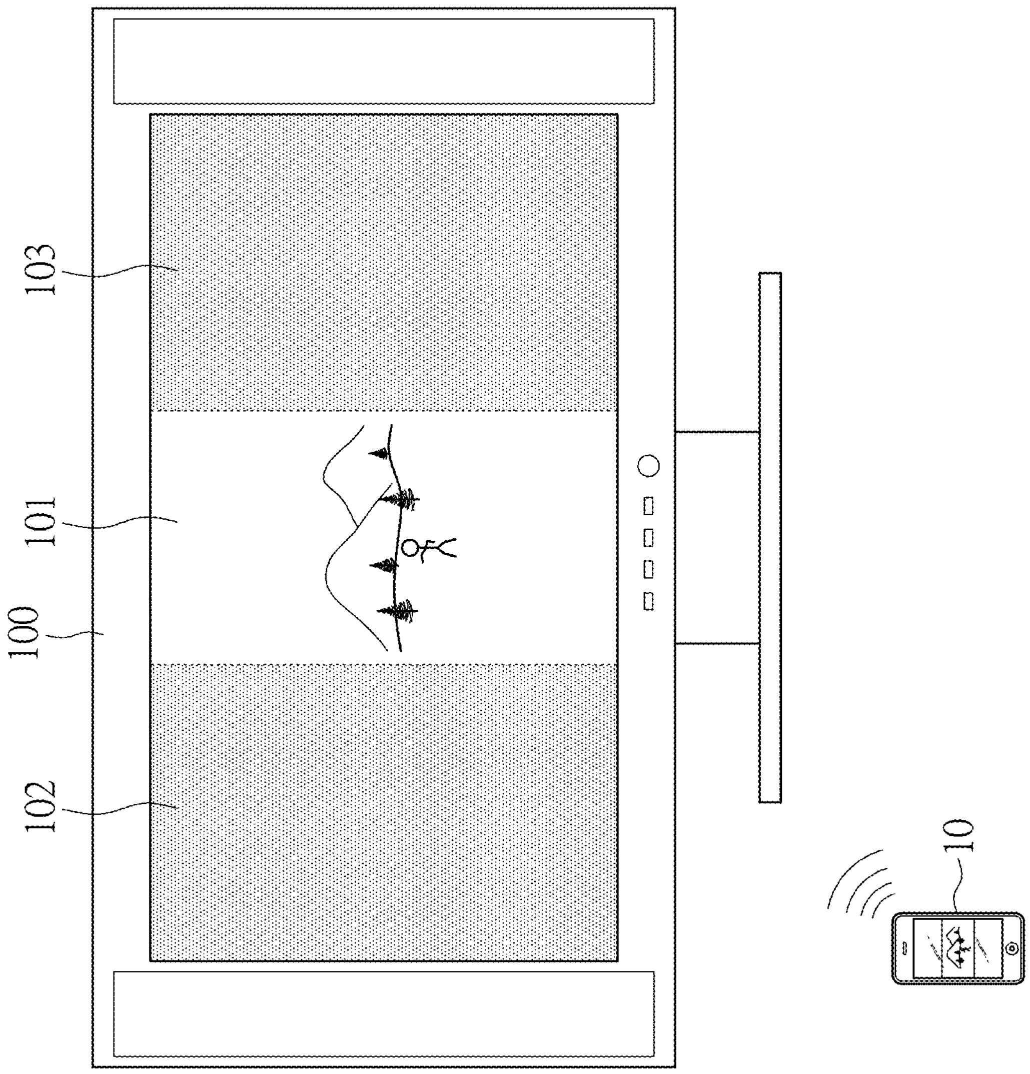
FIG. 1 RELATED ART
FIG. 1 is a schematic diagram illustrating a portrait-orientation image being casted and displayed on an external device in the related art.
Figure 2:
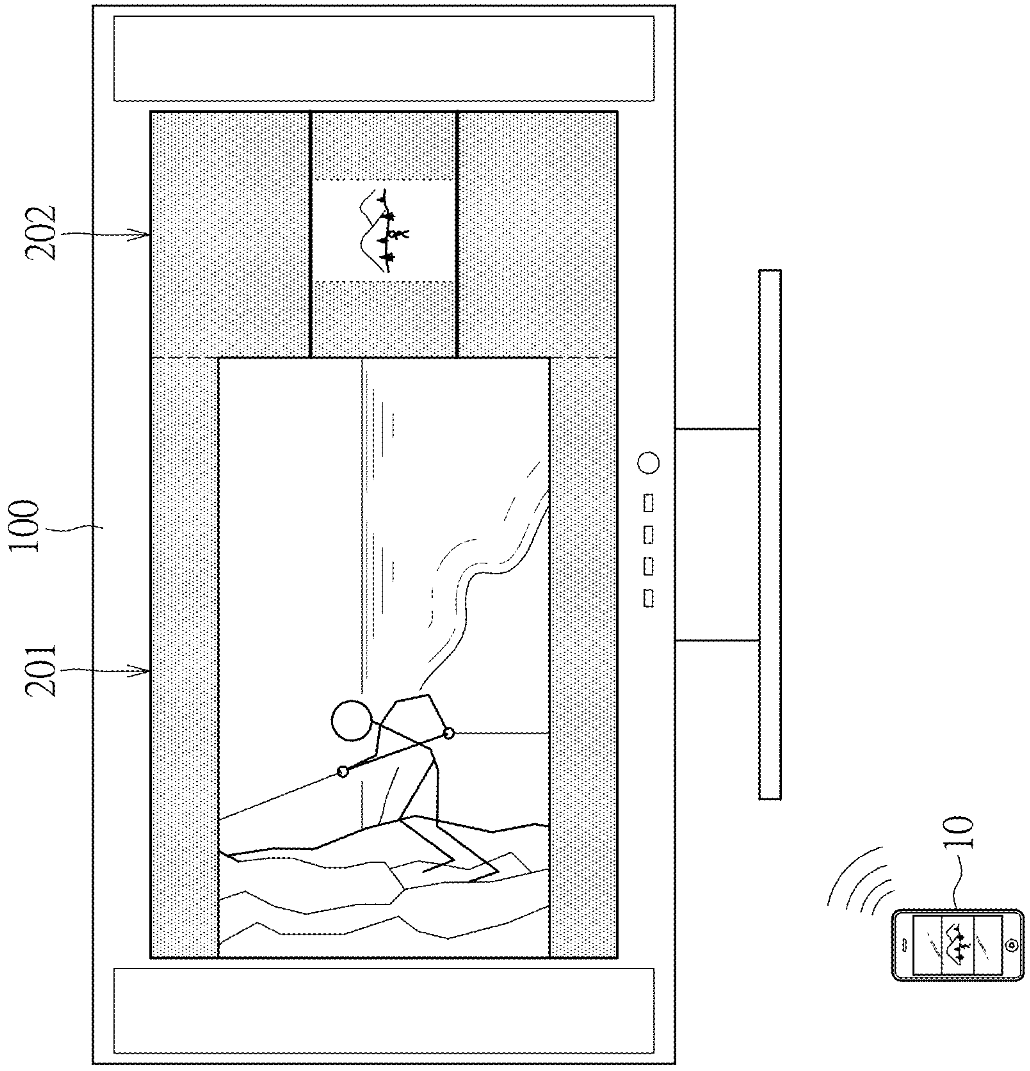
FIG. 2 RELATED ART
FIG. 2 is a schematic diagram illustrating a picture being displayed on the external device in a multi-window mode in the related art.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a," "an" and "the" includes plural reference, and the meaning of "in" includes "in" and "on." Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first," "second" or "third" can be used to describe various components, signals or the like, which are for distinguishing one component/signal from another one only, and are not intended to, nor should be construed to impose any substantive limitations on the components, signals or the like.

Figure 3:
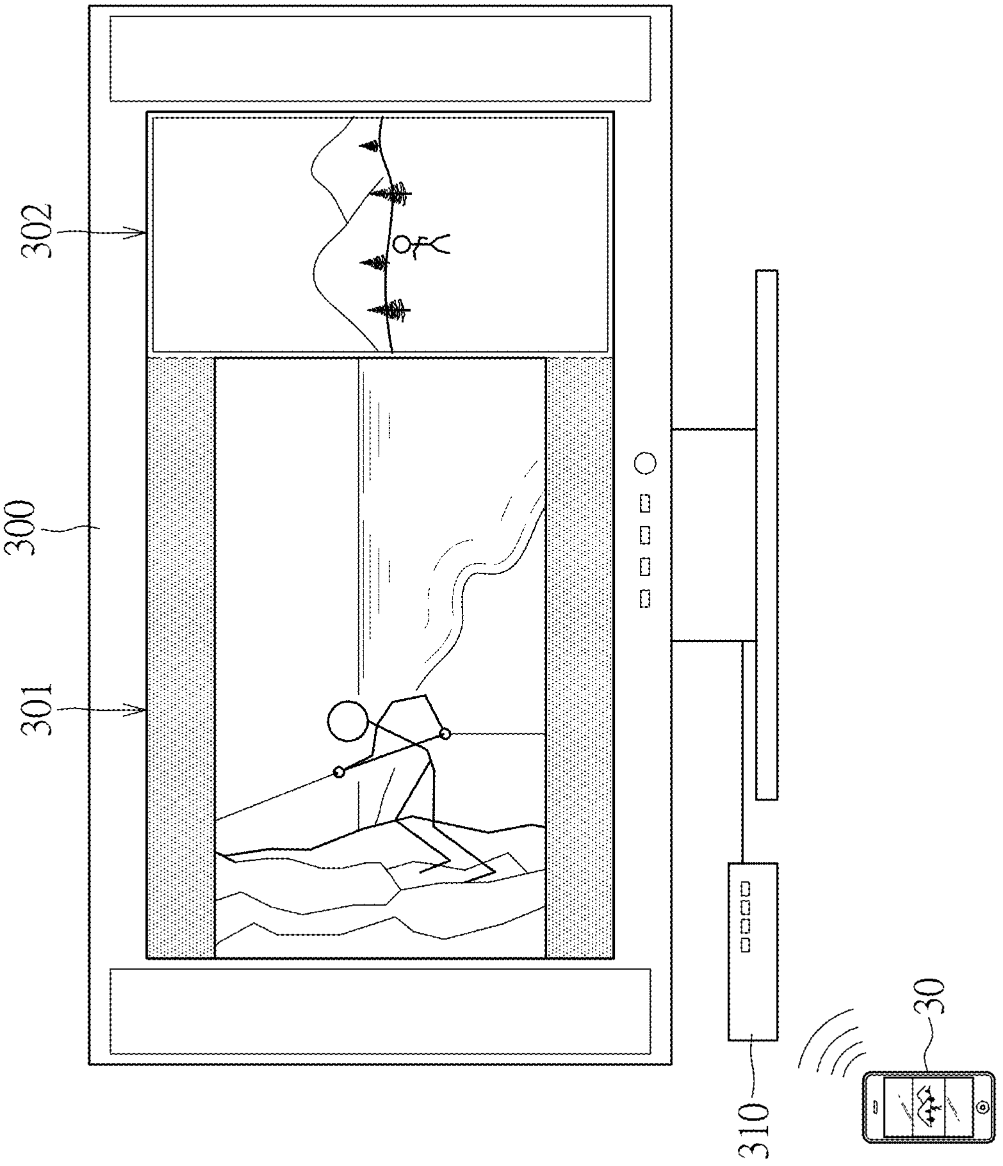
FIG. 3 is a schematic diagram illustrating a scenario in which a system performs a method for displaying a casted content on a split window according to one embodiment of the present disclosure.

In order to solve the problem of an inappropriate aspect ratio of a displayed content generated when a conventional image-casting technology casts a portrait-orientation image to an external device in a multi-window mode, the present disclosure provides a method for displaying a casted content on a split window and a circuit system. Reference is made to FIG. 3, which is a schematic diagram illustrating a scenario in which a system performs the method for displaying the casted content on the split window according to one embodiment of the present disclosure.

In the diagram, a user device 30 casts a content that is processed by an image-processing device 310 (e.g., a set-top box) onto a screen of a display device 300 by an image-casting technology. The image-processing device 310 can be integrated into the display device 300 (which can be a television).

The user device 30 is generally a handheld computer device, e.g., a smart phone, a tablet computer, and a laptop computer. The image-processing device 310 can be the set-top box or a circuit module integrated into the display device 300. The display device 300 can be a television device that provides a larger screen for viewing the content. The image-casting technology uses a wired connection (such as a USB Type-C or a HDMI™ cable) for connecting with an external device to display the displayed content, or uses a screen-mirroring technology (such as Miracast®, AirPlay®, or Google Chromecast®) to cast the content displayed on the user device 30 to the screen of the display device 300 via wireless streaming.

When the content displayed on the user device 30 is casted to the display device 300 by the image-casting technology, it is necessary to solve the problem of regions without any content being present on both sides of the screen when the display device displays a portrait-orientation image. In general, the regions without any content are shown as two black areas that may affect a user's viewing experience (especially under a multi-window display mode). In FIG. 3, the display device 300 operates a multi-window mode that drives the screen of the display device 300 to be divided into a first split window 301 and a second split window 302. The first split window 301 is used to display the content that is provided by the display device 300, and the second split window 302 is used to display the content casted from the user device 30 by the image-casting technology. In particular, when the portrait-orientation image generated by the user device 30 is casted to the second split window 302 of the display device 300, the circuit system performs the method for displaying the casted content on the split window, so as to crop the region detected to be without any content (e.g., the black area). In this way, the portrait-orientation image can be displayed in the second split window 302 in a better aspect ratio.

Figure 4:
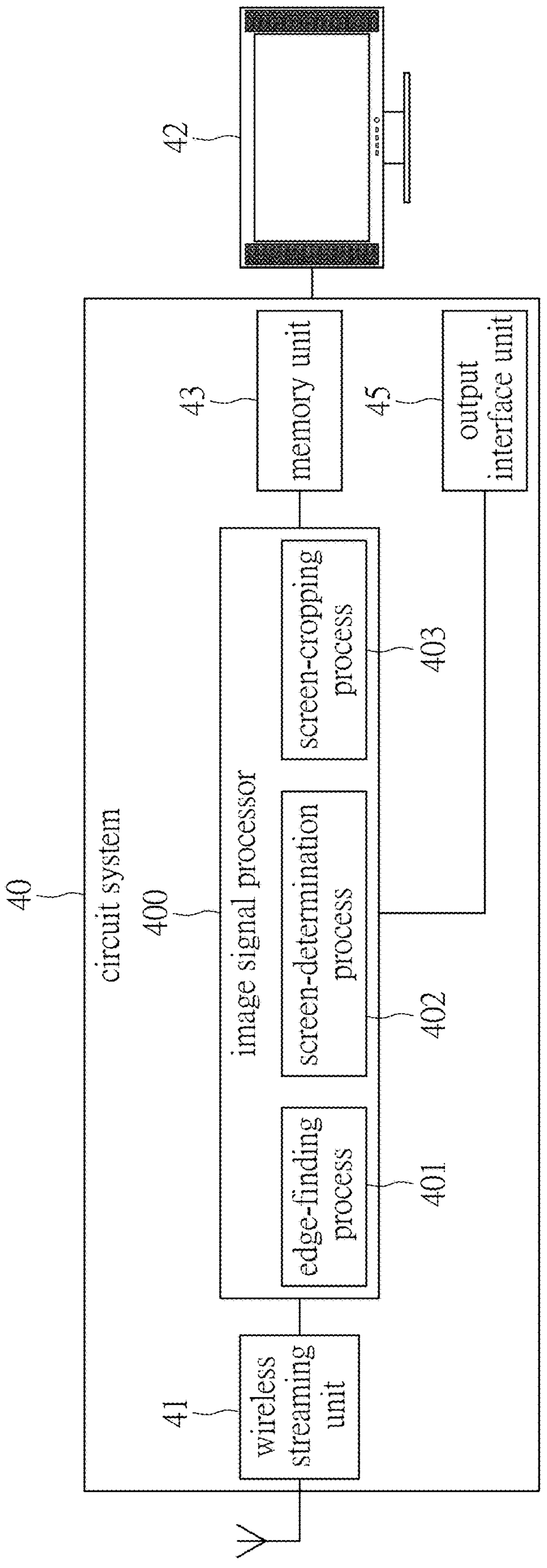
FIG. 4 is a schematic diagram illustrating a circuit system that performs the method for displaying the casted content on the split window according to one embodiment of the present disclosure.

Reference is made to FIG. 4, which is a schematic diagram illustrating the circuit system according to one embodiment of the present disclosure. A circuit system 40 can be implemented by hardware or software in an image-processing device that is connected with a display device. The circuit system 40 includes at least one image-processing circuit (which can be an image signal processor 400 shown in the diagram). The method for displaying the casted content on the split window of the present disclosure can be performed through collaboration of hardware and software.

According to one of the embodiments of the present disclosure, the circuit system 40 uses the image signal processor (ISP) 400 as a main processing circuit, so as to perform an edge-finding process 401 that is used to detect the region without any content, a screen-determination process 402 that is used to determine whether the casted content is a portrait-orientation image or a landscape-orientation image, and a screen-cropping process 403 through collaboration of hardware and software. The circuit system 40 includes a wireless streaming unit 41 that performs a specific wireless communication protocol for receiving image data transmitted by the user device with use of the image-casting technology. The image data is processed by the image signal processor 400, and can be outputted to a display device 42 via an output interface unit 45. Particularly, an image casted by the user device can be displayed in one of the split windows of the display device 42 under a multi-window display mode.

The image signal processor 400 receives image data transmitted from the user device (e.g., the user device 30 of FIG. 3) by an image-casting technology. The user device can be a handheld device that is capable of operating a portrait display mode and a landscape display mode. For example, the user device utilizes an internal sensor to sense orientation of the user device. The sensor can be an inertial measurement unit (IMU) that is implemented by combining an accelerometer and a gyroscope. The orientation of the user device can be determined based on an angular velocity and axial accelerations sensed by the inertial measurement unit of the user device. Thus, when the user device operates in a portrait display mode, a portrait-orientation image is transmitted to the display device by an image-casting technology. Conversely, when the user device operates in a landscape display mode, the landscape-orientation image is transmitted to the display device by the image-casting technology.

For the circuit system installed in the display device, when an image transmitted from the user device is received, the image is firstly determined as the portrait-orientation image or the landscape-orientation image. One of the ways to determine whether the image is a portrait-orientation image or a landscape-orientation image is the edge-finding process 401 performed by the image signal processor 400 of the circuit system 40. The edge-finding process 401 is used to detect an active region having a displayed content. Except for the active region, the remaining regions are inactive regions. The circuit system 40 uses a memory unit 43 to store a detection result that includes coordinate parameters of the active region. The screen-determination process 402 performed in the image signal processor 400 relies on features of the active region to identify whether the image casted by the user device is a portrait-orientation image or a landscape-orientation image. In an exemplary example, a difference between a width and a height of the active region or an aspect ratio between the width and the height of the active region can be used to determine whether the image casted by the user device is a portrait-orientation image or a landscape-orientation image.

Afterwards, the screen-cropping process 403 performed by the image signal processor 400 is used to crop the portrait-orientation image for removing the region without the displayed content. In one of the embodiments of the present disclosure, if the active region is determined as the landscape-orientation image, one or more inactive regions can be cropped based on information (e.g., coordinate parameters) of an active region image. Alternatively, if the active region is determined as the portrait-orientation image, the portrait-orientation image is displayed in one of the split windows of the display device 42. Other than the active region, the one or more inactive regions can be filled with a black color or other colors. The edge-finding process 401 is therefore used to find black edges of the image, so as to acquire the active region and one or more inactive regions. The screen-cropping process 403 is then used to crop the one or more inactive regions, and a display ratio of the image is adjusted. The adjusted image is outputted to the display device 42 via an input interface unit 45.

Figure 5:
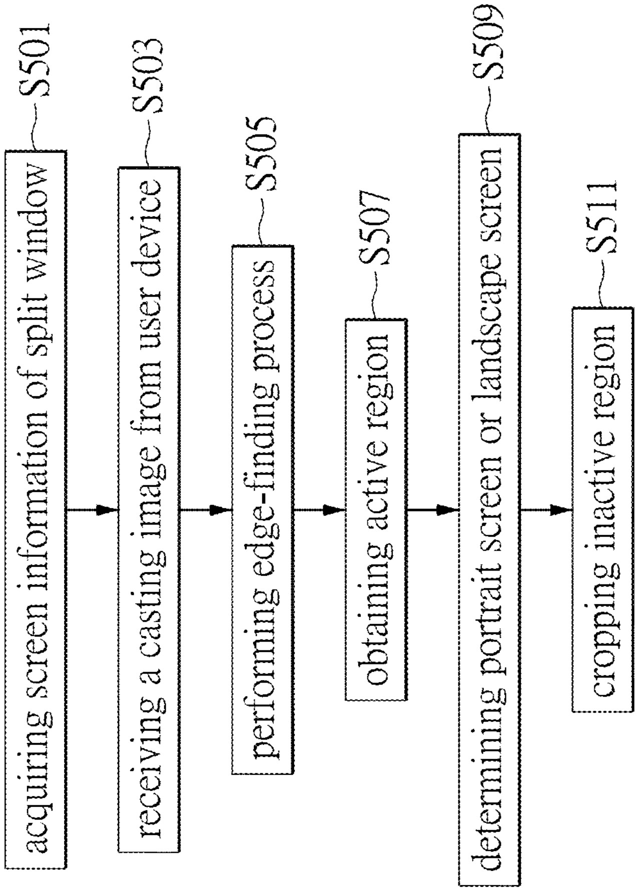
FIG. 5 is a flowchart illustrating the method for displaying the casted content on the split window according to one embodiment of the present disclosure.

Reference is made to FIG. 5, which is a flowchart illustrating the method for displaying the casted content on the split window according to one embodiment of the present disclosure. At the same time, reference can be made to FIG. 6, which is a reference diagram of the edge-finding process.

In the circuit system that performs the method, the content displayed on the display device and the screen having multiple split windows in a multi-window display mode are obtained (step S501). The display device can provide at least two split windows in the multi-window display mode that respectively display a screen obtained from a specific image source (e.g., a television program transmitted from the set-top box) and the active region image extracted from the image received by the user device.

Figure 6:
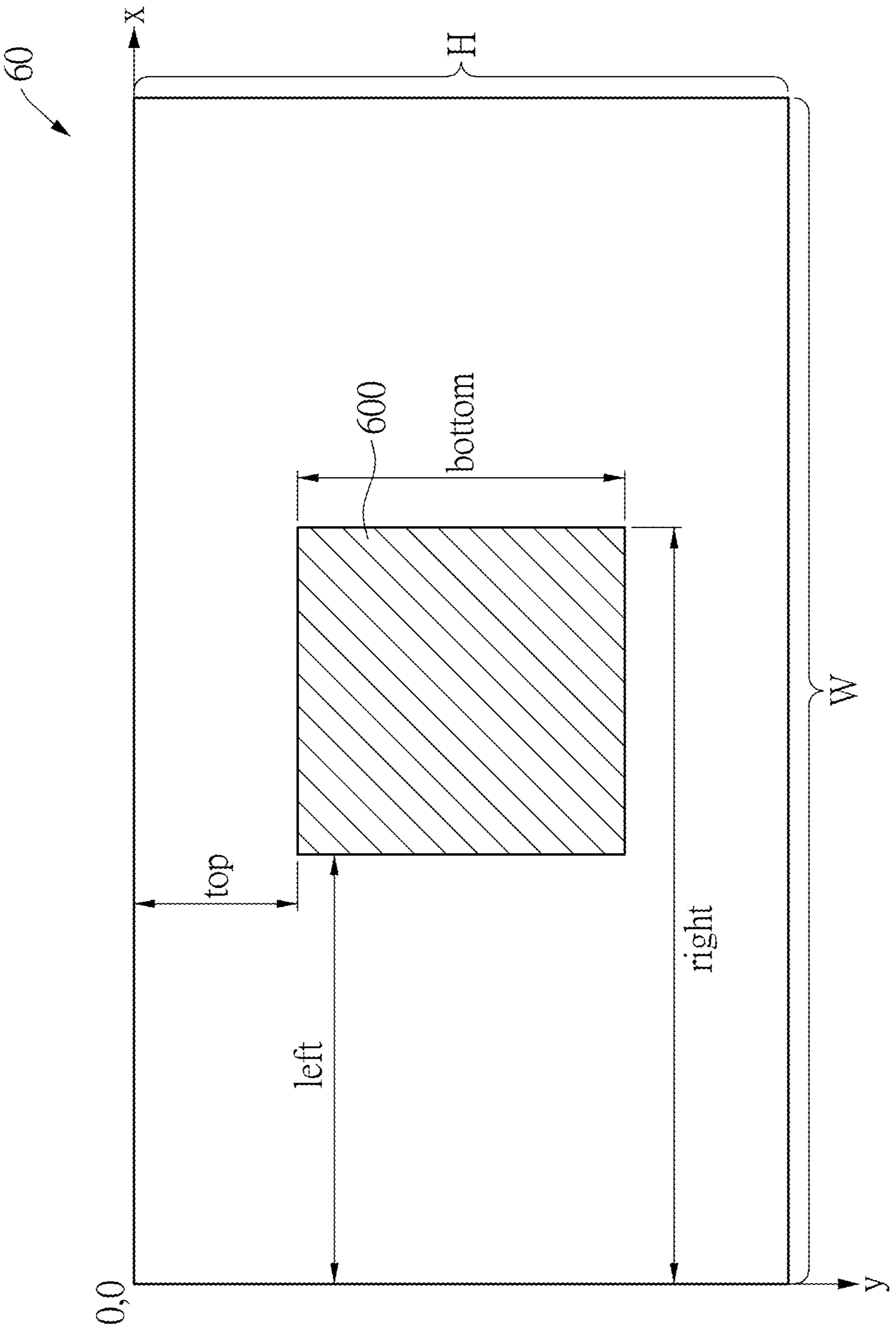
FIG. 6 is a schematic diagram illustrating an active region to be cropped in the method for displaying the casted content on the split window according to one embodiment of the present disclosure.

One of the split windows provided by the display device is, for example, a displayed content 60 having a height (H) and a width (W) shown in FIG. 6. The displayed content 60 is illustrated by a coordinate system with (x, y) coordinates. In the coordinate system, an origin (0, 0) of the displayed content 60 can be defined by an origin of pixels. After that, a series of images transmitted from the user device by the image-casting technology can be retrieved from the displayed content 60 displayed in the split window (step S503). The active region of the image received from the user device can be a portrait-orientation image or a landscape-orientation image.

The edge-finding process 401 is performed according to the image features of the active region having the content and the inactive region without the displayed content 60 (step S505). In one of the embodiments, before the edge-finding process 401 is performed, a coordinate system for the split window is firstly established. The edge-finding process 401 is used to obtain the edges of the image based on the features of the image, such that an active region 600 having the content of the image and coordinate parameters of the active region 600 can be obtained (step S507). For example, based on an origin (0,0) of the coordinate system, the coordinate parameters used to describe the active region 600 include top coordinates, bottom coordinates, left coordinates, and right coordinates. The memory unit 43 of the circuit system 40 is used to store the coordinate parameters. Thus, rather than the inactive region without the content, the active region 600 obtained by the edge-finding process 401 acts as the image casted by the user device through the image-casting technology.

The size of the active region 600 occupying the displayed content 60 can be obtained according to the coordinate parameters that include the top coordinates, the bottom coordinates, the left coordinates, and the right coordinates. Referring to an exemplary example shown in FIG. 6, a width of the active region 600 can be obtained by subtracting the left coordinates from the right coordinates, and a height of the active region 600 can be obtained by subtracting the top coordinates from the bottom coordinates. Next, the screen-determination process 402 is performed. According to one of the embodiments of the present disclosure, the image to be casted by the user device can be determined to be the portrait-orientation image or the landscape-orientation image according to a difference or a ratio between the width and the height of the active region 600. For example, the image to be casted is determined as the landscape-orientation image if the width is larger than the height of the active region, or the image is determined as the portrait-orientation image if the width is smaller than the height of the active region. Correspondingly, the user device can display the content in a portrait display mode or a landscape display mode (step S509).

For example, common display screen ratios of smartphones or tablets are 21:9, 16:9, and 4:3 (but are not limited thereto). Therefore, a ratio of the width to the height of the active region 600 can be used to determine whether the displayed content in the split window is a portrait-orientation image or a landscape-orientation image.

According to one embodiment of the present disclosure, in the method for displaying the casted content on the split window, the screen-cropping process 403 can be performed only on the portrait-orientation image, so as to crop one or more inactive regions outside the active region (step S511). In this step, if the features of the image received from the user device cannot be used to determine whether the casting image is a portrait-orientation image or a landscape-orientation image, it is not necessary to perform the screen-cropping process 403 until it is determined that the casting image is the portrait-orientation image. However, if the casting image is determined as the landscape-orientation image, there is no need to perform the screen-cropping process 403, or the casting image is only slightly cropped. After that, the circuit system outputs a cropped image of the active region 600 to the display device. Further, a display ratio of the active region image to be displayed in the split window can be adjusted according to an aspect ratio of the active region 600 occupying the split window. Therefore, the image of the active region 600 can be displayed in the split window with a better display ratio.

Further, when the active region of the image casted by the user device is firstly obtained by the circuit system, the coordinate parameters of the active region are stored in a memory of the circuit system, such as the memory unit 43 of FIG. 4. Therefore, it is not necessary to repeatedly perform edge finding and cropping processes that may cause the system unstable.

Figure 7:
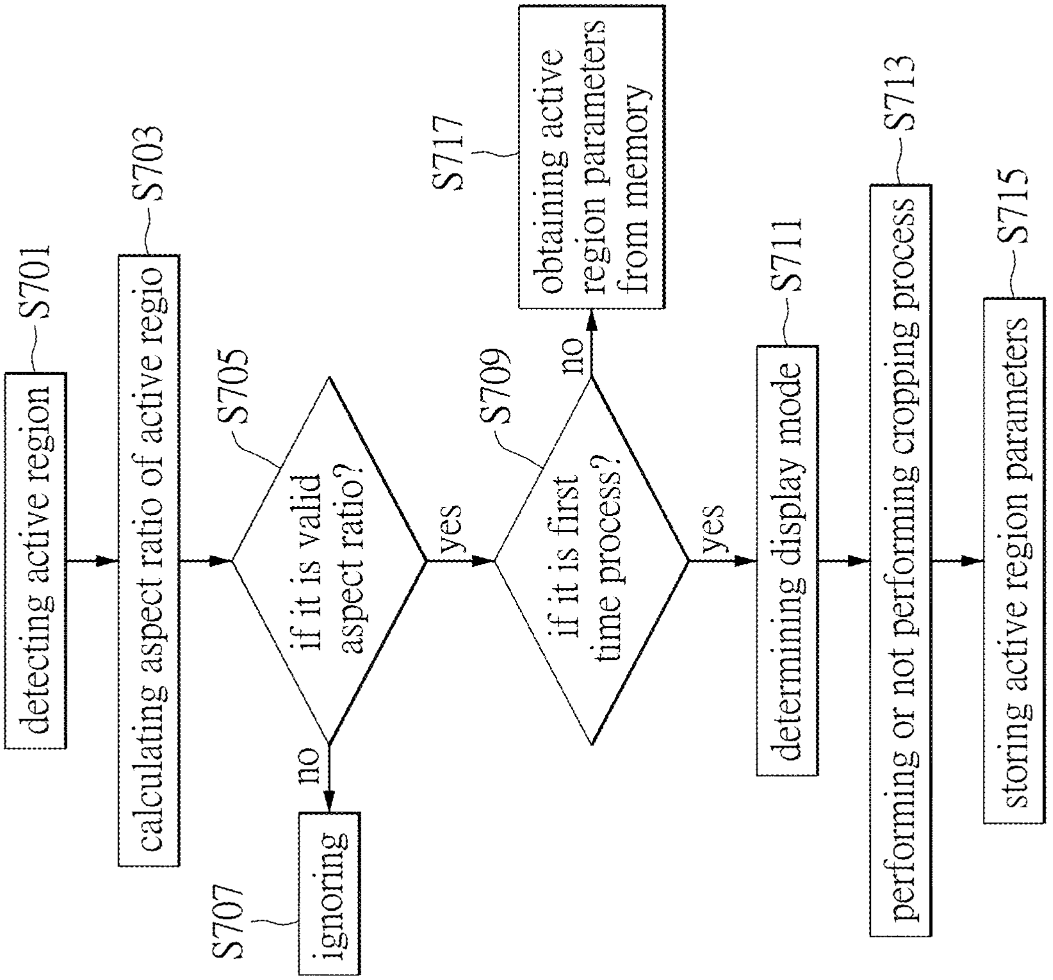
FIG. 7 is a flowchart illustrating a process of determining whether or not to use stored parameters for displaying a picture in the method for displaying the casted content on the split window according to one embodiment of the present disclosure.

FIG. 7 is a flowchart illustrating a process of determining whether or not to use stored active region parameters for displaying the displayed content in the method for displaying the casted content on the split window according to one embodiment of the present disclosure.

In the process, the circuit system receives continuous frames from the user device in a streaming manner, detects the active region having the displayed content according to features of each of the frames (step S701), and calculates an aspect ratio of the active region (step S703).

After that, the circuit system determines whether or not the aspect ratio of the active region is a valid aspect ratio (step S705), so as to exclude the image data that cannot be processed or the incorrect image data. For example, common aspect ratios of the image are 21:9, 16:9, 4:3, 1:1, 4:5, and 9:16 (but are not limited thereto) Accordingly, any aspect ratio of the image that ranges between 21:9 and 9:16 is determined as the valid aspect ratio. If the circuit system determines that the active region does not have a valid aspect ratio (represented as "no"), the image can be neglected (step S707). Conversely, if the circuit system determines that the active region has a valid aspect ratio (represented as "yes"), the circuit system then determines whether or not the active region is processed for a first time (step S709). If the active region is determined to be processed for the first time in an image-processing procedure (represented as "yes"), the display mode of the display device is further determined, in which the circuit system determines whether or not the display device displays the image in a multi-window display mode, and obtains a quantity of the split windows and screen information of each of the split windows (step S711).

The screen information of the split window can be, for example, a split window number, a window ratio, and a window size. Further, the information of the active region image that is a portrait-orientation image or a landscape-orientation image is also obtained. Accordingly, the circuit system can determine whether or not to perform the screen-cropping process (step S713). When the active region is determined as the portrait-orientation image, it is necessary to crop the one or more inactive regions. When the active region is determined as the landscape-orientation image, the casting image is slightly cropped, or it is not necessary to crop the casting image. Afterwards, the information obtained by the above steps and the active region parameters can be stored in a memory of the circuit system (step S715), and the stored information is available for processing the subsequent frames.

Conversely, if the active region is not firstly obtained in the image-processing procedure, the coordinate parameters of the active region and relevant display information can be retrieved from the memory and applied for displaying the active region image after the active region is firstly obtained. The active region image can then be displayed in one of the split windows after adjustment of a display ratio of the active region image (step S717). In this way, the repeated steps can be omitted.

It should be noted that, according to the above embodiments, when the user device continuously cast images to the display device in the same display mode, the steps of repeatedly obtaining the coordinate parameters of the active region and adjusting the display ratio of the active region image to be displayed in the split window can be omitted for being in the same image-processing procedure. The images can therefore be casted to any of the split windows of the display device. In the method for displaying the casted content on the split window, when the user device switches the display mode (e.g., the portrait display mode is switched to the landscape display mode or the landscape display mode is switched to the portrait display mode), the circuit system then determines that the steps of determining the active region of the image and adjusting the display ratio for outputting the cropped active region image need to be performed again, so as to display the image in an appropriate ratio in one of the split windows.

According to the above embodiments of the method for displaying the casted content on the split window and the circuit system of the present disclosure, the circuit system can rely on the features of the image transmitted from the user device by the image-casting technology to determine whether the image is a portrait-orientation image or a landscape-orientation image. Accordingly, different schemes are provided for processing the portrait-orientation image or the landscape-orientation image. More particularly, the edge-finding process is performed for obtaining edges of the portrait-orientation image casted by the user device, and the active region with the displayed content can be cropped based on the edges obtained by the edge-finding process. After an appropriate adjustment of the display ratio, an active region image can be displayed in one of the split windows. Conversely, if the image casted by the user device is the landscape-orientation image, it is indicated that an area of the inactive region to be filled is smaller or there is no inactive region to be filled when the display device displays the image. Therefore, the display device can directly display the casting image obtained from the user device or the image with slight cropping. Thus, the display device can display the casting image in an appropriate display ratio, and the instability problem can also be avoided (since the circuit system does not need to repeatedly perform the image-processing procedure, detect the active region, and crop the image).

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A method for displaying a casted content on a split window, which is performed in a circuit system of a display device, the method comprising:

receiving an image from a user device when the display device is operated under a multi-window display mode, wherein the display device provides at least two split windows in the multi-window display mode and the at least two split windows are provided to respectively display at least a screen received from an image source and an active region image;

obtaining the active region of the image; and extracting an active region image from the image, and displaying the active region image in one of the at least two split windows of the display device after a display ratio of the active region image is adjusted.

2. The method according to claim 1, wherein the active region image extracted from the image is a portrait-orientation image or a landscape-orientation image.

3. The method according to claim 2, wherein the user device is a handheld device that provides a portrait display mode and a landscape display mode, and the user device transmits the portrait-orientation image or the landscape-orientation image to the display device by an image-casting technology.

4. The method according to claim 3, wherein the image to be casted by the user device is determined to be the portrait-orientation image or the landscape-orientation image according to a difference or a ratio between a width and a height of the active region.

5. The method according to claim 4, wherein, when the active region is determined as the landscape-orientation image, one or more inactive regions are cropped based on information of the active region image.

6. The method according to claim 4, wherein, when the active region is determined as the portrait-orientation image, an edge-finding process is used to obtain the active region and one or more inactive regions, and the one or more inactive regions are cropped from the image.

7. The method according to claim 6, wherein the active region is obtained by the edge-finding process, and an aspect ratio of the split window occupied by the active region is obtained; wherein the aspect ratio is referred to for adjusting the display ratio of the active region image that is to be displayed in the split window.

8. The method according to claim 1, wherein the process of extracting the active region image by the circuit system comprises:

obtaining screen information for the display device to display the image that is transmitted by the user device;

obtaining window information for the display device to display the split window that is configured to display the image;

establishing a coordinate system of the split window that displays the image, and obtaining edges of the image based on features of the image, so as to obtain the active region; and obtaining the active region image by cropping the image based on coordinate parameters of the active region.

9. The method according to claim 8, wherein, in the circuit system, when the active region is firstly obtained, a memory is used to store the coordinate parameters of the active region.

10. The method according to claim 9, wherein, in the process of displaying the active region image after the active region is firstly obtained, the coordinate parameters of the active region are retrieved from the memory, and the active region image is displayed in the split window after adjustment of the display ratio.

11. A circuit system disposed in a display device, comprising:

an image-processing circuit, wherein the image-processing circuit performs a method for displaying a casted content on a split window, and the method includes:

receiving an image from a user device when the display device is operated under a multi-window display mode, wherein the display device provides at least two split windows in the multi-window display mode and the at least two split windows are provided to respectively display at least a screen received from an image source and an active region image;

obtaining the active region of the image; and extracting an active region image from the image, and displaying the active region image in one of the at least two split windows of the display device after a display ratio of the active region image is adjusted.

12. The circuit system according to claim 11, wherein the process of extracting the active region image by the circuit system comprises:

obtaining screen information for the display device to display the image that is transmitted by the user device;

obtaining window information for the display device to display the split window that is configured to display the image;

establishing a coordinate system of the split window that displays the image, and obtaining edges of the image based on features of the image, so as to obtain the active region; and obtaining the active region image by cropping the image based on coordinate parameters of the active region.

13. The circuit system according to claim 11, wherein the circuit system embodies an image-processing device connected with the display device for receiving the image casted from the user device by an image-casting technology.

14. The circuit system according to claim 13, wherein the user device is a handheld device that is capable of operating a portrait display mode and a landscape display mode; wherein, when the user device operates the portrait display mode, a portrait-orientation image is transmitted to the display device by the image-casting technology.

15. The circuit system according to claim 14, wherein, when the active region is determined as a landscape-orientation image, one or more inactive regions are cropped based on information of the active region image.

16. The circuit system according to claim 15, wherein the process of extracting the active region image by the circuit system comprises:

obtaining screen information for the display device to display the image that is transmitted by the user device;

obtaining window information for the display device to display the split window that is configured to display the image;

establishing a coordinate system of the split window that displays the image, and obtaining edges of the image based on features of the image, so as to obtain the active region; and obtaining the active region image by cropping the image based on coordinate parameters of the active region.

17. The circuit system according to claim 14, wherein, when the active region is determined as the portrait-orientation image, one or more inactive regions that are obtained by an edge-finding process are cropped, and an aspect ratio of the split window occupied by the active region is obtained; wherein the aspect ratio is referred to for adjusting the display ratio of the active region image that is to be displayed in the split window.

18. The circuit system according to claim 17, wherein the process of extracting the active region image by the circuit system comprises:

obtaining screen information for the display device to display the image that is transmitted by the user device;

obtaining window information for the display device to display the split window that is configured to display the image;

establishing a coordinate system of the split window that displays the image, and obtaining edges of the image based on features of the image, so as to obtain the active region; and obtaining the active region image by cropping the image based on coordinate parameters of the active region.

19. The circuit system according to claim 18, wherein, when the active region is firstly obtained, a memory is used to store the coordinate parameters of the active region obtained by the edge-finding process.

* * * * *